United States Patent
Lee et al.

(10) Patent No.: US 7,382,726 B2
(45) Date of Patent: Jun. 3, 2008

(54) NODE SYSTEM, DUAL RING COMMUNICATION SYSTEM USING NODE SYSTEM, AND COMMUNICATION METHOD THEREOF

(75) Inventors: Sang-Woo Lee, Daejeon (KR); Heyung-Sub Lee, Daejeon (KR); Hyeong-Ho Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 994 days.

(21) Appl. No.: 10/426,402

(22) Filed: Apr. 30, 2003

(65) Prior Publication Data

US 2004/0100909 A1 May 27, 2004

(30) Foreign Application Priority Data

Nov. 25, 2002 (KR) .................. 10-2002-0073519

(51) Int. Cl.
*H04J 3/14* (2006.01)
(52) U.S. Cl. ....................................... 370/231
(58) Field of Classification Search .............. 370/236.1
See application file for complete search history.

(56) References Cited

U.S. PATENT DOCUMENTS 5,313,454 A * 5/1994 Bustini et al. .............. 370/231
6,314,110 B1   11/2001 Chin et al.
6,650,618 B1 * 11/2003 Peng et al. ................. 370/229
2003/0076781 A1 * 4/2003 Enomoto et al. ........... 370/229

FOREIGN PATENT DOCUMENTS

EP          1061698 A2 * 12/2000
JP       2001-045036      2/2001

OTHER PUBLICATIONS

"Part 17: Resilient packet ring access method & physical layer specifications", IEEE Draft P802.17/D1.0 Aug. 12, 2002p. 27-32, Jan. 1999.

* cited by examiner

*Primary Examiner*—Doris H. To
*Assistant Examiner*—Kerri M Rose
(74) *Attorney, Agent, or Firm*—Blakely, Sokoloff, Taylor & Zafman LLP

(57) ABSTRACT

A dual ring communication method using a node system includes: with congestion occurring in a first node system, the first node system generating a congestion information packet and forwarding it to an upper node system positioned in a direction opposed to a direction of forwarding a data packet; a second node system determining whether it is the last node involved in the congestion; adding its congestion information to the congestion information packet and forwarding the congestion information packet to an upper node system when the second node system is not the last node; performing bandwidth allocation for the node systems in other case; and generating a bandwidth allocation packet and transmitting the bandwidth allocation packet to the node systems involved in the congestion.

22 Claims, 7 Drawing Sheets

NODE SYSTEM, DUAL RING COMMUNICATION SYSTEM USING NODE SYSTEM, AND COMMUNICATION METHOD THEREOF

BACKGROUND OF THE INVENTION (a) Field of the Invention

The present invention relates to a communication system in a bi-directional dual ring network, and a method thereof. More specifically, the present invention relates to a node system, a bi-directional dual ring communication system having a function of controlling communication congestion between node systems, and a communication method thereof.

(b) Description of the Related Art

In a ring network comprised of nodes having a dual ring access function and being capable of bi-directional data transmission, each of the nodes transmits its packet using a desired bandwidth in a normal state without congestion, but if congestion occurs, it controls the congestion using a congestion control algorithm.

More specifically, the individual nodes check the bandwidth for packet forwarding (providing a packet received from a second node to a third one) and the bandwidth for packet transmission (providing an intrinsically generated packet to a second node). If it is impossible to transmit as many packets as desired because the bandwidth for packet forwarding is excessively large, then the corresponding node considers that congestion occurs, and informs the upper node of its transmission amount according to the congestion control algorithm.

If the transmission bandwidth is larger than the received bandwidth, then the node receiving the information about the transmission amount lowers its transmission bandwidth to the received bandwidth, and forwards the received bandwidth to an upper node. Otherwise, if the transmission bandwidth is smaller than the received bandwidth, then the node informs the upper node of its transmission bandwidth. This procedure relieves the congestion. After relief of the congestion, each node gradually increases its transmission amount.

This method, which has the individual nodes independently perform congestion control, controls the congestion more rapidly and allocates the transmission bandwidth to each node more flexibly, relative to the method in which a specific node controls all the nodes on the whole ring.

In the method, however, all the nodes involved in the congestion uniformly adjust their transmission bandwidth to the transmission bandwidth of the node detecting the congestion, thus deteriorating the use efficiency of the link bandwidth, and the total bandwidth of the link is reduced, gradually increased, and with the congestion, reduced again, thereby oscillating the used amount of the bandwidth of the link.

SUMMARY OF THE INVENTION

It is an object of the present invention to solve the problems with the prior art and to efficiently control congestion occurring when each node transmits a packet in a bi-directional dual ring network comprised of a plurality of nodes.

It is another object of the present invention to impartially allocate a bandwidth to the individual nodes involved in the congestion, thereby relieving the congestion and efficiently using the entire bandwidth of the link.

In one aspect of the present invention, there is provided a communication method for a bi-directional dual ring communication system including a plurality of node systems, the communication method including: (a) with congestion occurring in a first node system, the first node system generating a congestion information packet and forwarding the generated congestion information packet to an upper node system positioned in a direction diametrically opposed to a direction of forwarding a data packet; (b) a second node system determining whether or not it is the last node involved in the congestion, upon receiving the congestion information packet; (c) the second node system adding its congestion-related information to the congestion information packet and forwarding the congestion information packet to an upper node system, when the second node system is not the last node involved in the congestion; (d) the second node system performing bandwidth allocation for the individual node systems based on information included in the congestion information packet, when the second node system is the last node involved in the congestion; and (e) after performing the bandwidth allocation, the second node system generating a bandwidth allocation packet and transmitting the generated bandwidth allocation packet to the individual node systems involved in the congestion, thereby causing the corresponding node systems to vary their transmission bandwidth and relieve the congestion.

The congestion information packet includes: a header field representing that the packet is a congestion information packet; a used bandwidth field specifying a bandwidth currently used by the node system; a requested bandwidth field specifying a requested bandwidth necessary for the node system transmitting its packet; and a transmission node address field specifying a hardware address of the node system currently transmitting the congestion information packet. The congestion information packet further includes: a weight field specifying a weight allocated to the corresponding node system in a whole ring; and a checksum field used to check whether or not the packet has an error.

In this case, the step (b) includes the second node system determining itself as the last node involved in the congestion, when the sum of the individual bandwidths specified in the used bandwidth field of the received congestion information packet and a bandwidth currently used by the second node system is equal to a predetermined maximum link bandwidth.

The step (c) includes the second node system adding congestion-related information to the congestion information packet and forwarding the congestion information packet to the upper node system, the congestion-related information including a bandwidth being used by the second node system, a requested bandwidth necessary for the second node system transmitting the packet, and a hardware address of the second node system.

On the other hand, the bandwidth allocation packet includes: a header field representing that the packet is a bandwidth allocation packet; an allocated bandwidth field specifying a bandwidth allocated to each node system as determined from the bandwidth allocation; and a reception node address field specifying hardware addresses of the node systems receiving the bandwidth allocation packet. In addition, the bandwidth allocation packet further includes a checksum field used to check whether or not the packet has an error.

In this case, the step (e) includes: upon receiving the bandwidth allocation packet, the node system storing its allocated bandwidth, deleting its information from the bandwidth allocation packet, and forwarding the bandwidth allocation packet to a lower node system positioned in a forwarding direction of the bandwidth allocation packet, when the hardware address of the corresponding node system is recorded in the reception node address field of the bandwidth allocation packet; and the node system adjusting its transmission bandwidth to the allocated bandwidth based on the stored information.

The step (d) includes: allocating the bandwidth to each node system involved in the congestion according to the following equation:

allocated bandwidth of node=(requested bandwidth of corresponding node)/(the sum of requested bandwidths of nodes involved in congestion)× (maximum bandwidth of link)

The communication method further includes: forwarding the received congestion information packet to an upper node system, when the second node system is neither the last node system involved in the congestion nor a node system involved in the congestion. Preferably, the step (a) includes comparing a first bandwidth of the received data packet, a second bandwidth of a packet to be transmitted, and a maximum bandwidth of a link, and determining that congestion occurs when the sum of the first and second bandwidths is greater than the maximum bandwidth of the link.

In another aspect of the present invention, there is provided a node system, which is used as a node in a bi-directional dual ring communication system, the node system including: a ring physical layer for providing access to a link on the dual ring; a MAC(media access controller) for controlling transmission and forwarding of a data packet and a control packet through the ring physical layer, and determining the occurrence of congestion based on the bandwidth of the input data packet; a congestion control processor for generating a congestion information packet, when the congestion occurs, and transmitting the generated congestion information packet to an upper node system positioned in a direction diametrically opposed to a forwarding direction of the data packet; a bandwidth allocation processor for receiving a bandwidth allocation packet from the upper node system via the MAC, and performing bandwidth allocation based on information stored in the bandwidth allocation packet; a packet reception processor for forwarding the data packet received via the MAC to an upper layer; and a packet transmission processor for adjusting the bandwidth of the data packet to be transmitted to a bandwidth determined according to the bandwidth allocation of the bandwidth allocation processor, and transmitting the data packet to the upper layer on the ring through the MAC.

The bandwidth allocation processor adjusts its transmission bandwidth based on its allocated bandwidth recorded in the allocated bandwidth field of the bandwidth allocation packet.

In further another aspect of the present invention, there is provided a dual ring communication system for a bi-directional dual ring communication system including a plurality of node systems, the dual ring communication system including: a first node system for generating a congestion information packet and forwarding the generated congestion information packet to an upper node system positioned in a direction diametrically opposed to a direction of forwarding a data packet, when a bandwidth of a data packet input from the upper node and a bandwidth of a data packet to be transmitted are checked to sense congestion; and a second node system being the last node system involved in the congestion, the second node system performing a bandwidth allocation process based on the congestion information packet forwarded from the first node system, generating a bandwidth allocation packet according to the result of the bandwidth allocation, and transmitting the generated bandwidth allocation packet to the first node system, thereby causing the first node system to adjust a transmission bandwidth.

In addition, the dual ring communication system further includes at least one third node system positioned between the first and second node systems, the third node system, if involved in the congestion, adding its congestion-related information to the congestion information packet, forwarding the congestion information packet to the second node system, and adjusting its transmission bandwidth based on the bandwidth allocation packet.

In this case, the first node system includes: a ring physical layer for providing access to a link on the dual ring; a MAC for controlling transmission and forwarding of the data packet and a control packet through the ring physical layer, and determining the occurrence of congestion based on the bandwidth of the input data packet; a congestion control processor for generating a congestion information packet as the control packet, when the congestion occurs, and transmitting the generated congestion information packet to an upper node system positioned in a direction diametrically opposed to a forwarding direction of the data packet; a bandwidth allocation processor for receiving a bandwidth allocation packet as the control packet forwarded from the upper node system via the MAC, and performing bandwidth allocation based on information stored in the bandwidth allocation packet; a packet reception processor for forwarding the data packet received via the MAC to an upper layer; and a packet transmission processor for adjusting the bandwidth of the data packet to be transmitted to a bandwidth determined according to the bandwidth allocation of the bandwidth allocation processor, and transmitting the data packet to the upper layer on the ring through the MAC.

The second node system includes: a ring physical layer for providing access to a link on the dual ring; a MAC for controlling transmission and forwarding of the data packet and a control packet through the ring physical layer; a congestion information table for storing congestion information; a congestion control processor for processing a congestion information packet as the control packet received via the MAC, and storing the corresponding congestion information in the congestion information table; a bandwidth allocation processor for performing bandwidth allocation based on the congestion information stored in the congestion information table, generating a bandwidth allocation packet according to the bandwidth allocation, and providing the generated bandwidth allocation packet to the MAC, thereby causing the bandwidth allocation packet to be forwarded to lower node systems positioned in a direction diametrically opposed to a forwarding direction of the congestion information packet; and a packet transmission processor for adjusting the bandwidth of the data packet, to be transmitted, to a bandwidth determined according to the bandwidth allocation of the bandwidth allocation processor, and transmitting the data packet to the upper layer on the ring through the MAC.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

Figure 1:
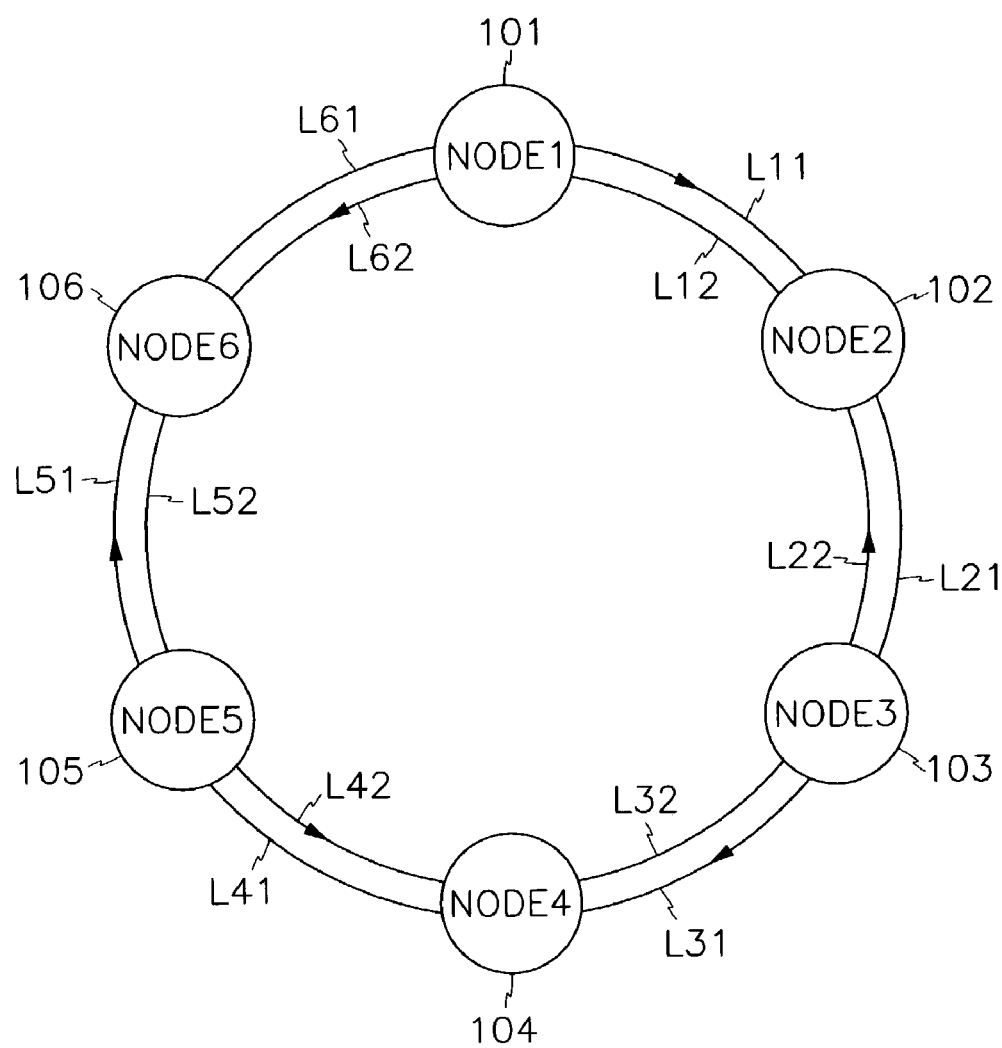
FIG. 1 is a schematic of a bi-directional dual ring communication system comprised of a plurality of nodes according to an embodiment of the present invention.

FIG. 1 is a schematic of a bi-directional dual ring communication system (hereinafter referred to as a "dual ring communication system") comprised of a plurality of nodes according to an embodiment of the present invention.

The dual ring communication system shown in FIG. 1 comprises six nodes 101 to 106, each of which is coupled to another one via two links L11 and L12, L21 and L22, L31 and L32, L41 and L42, L51 and L52, or L61 and L62. The packet forwarding direction of one link is diametrically opposed to that of the other link. The ring comprised of the outer links L11, L21, L31, L41, L51, and L61 is called the "outer ring," and the ring comprised of the inner links L12, L22, L32, L42, L52, and L62 is called the "inner ring."

When the outer ring transmits packets in a clockwise direction, the inner ring transmits packets in a counterclockwise direction. The nodes transmit a data packet and a control packet using a different ring. When the data packet is transmitted through the inner ring, for example, the control packet is transmitted through the outer ring.

Each node transmits its packet through either the outer ring or the inner ring. The node checks the destination address of an input packet, and if the destination address is its address, then the node eliminates the packet from the ring. Otherwise, if the destination address is not its address, then the node forwards the packet to the next node. To transmit a packet from node 1 101 to node 3 103, for example, the node 1 101 transmits the packet to node 2 102 through the link L11, and the node 2 102 forwards the packet to the node 3 103 through the link L21 because the destination of the packet is not the node 2. The term "transmission" as used herein means a node's generating a packet and sending it on a link, and the term "forwarding" as used herein means a node's sending a packet received from the upper node to the next one.

Figure 2:
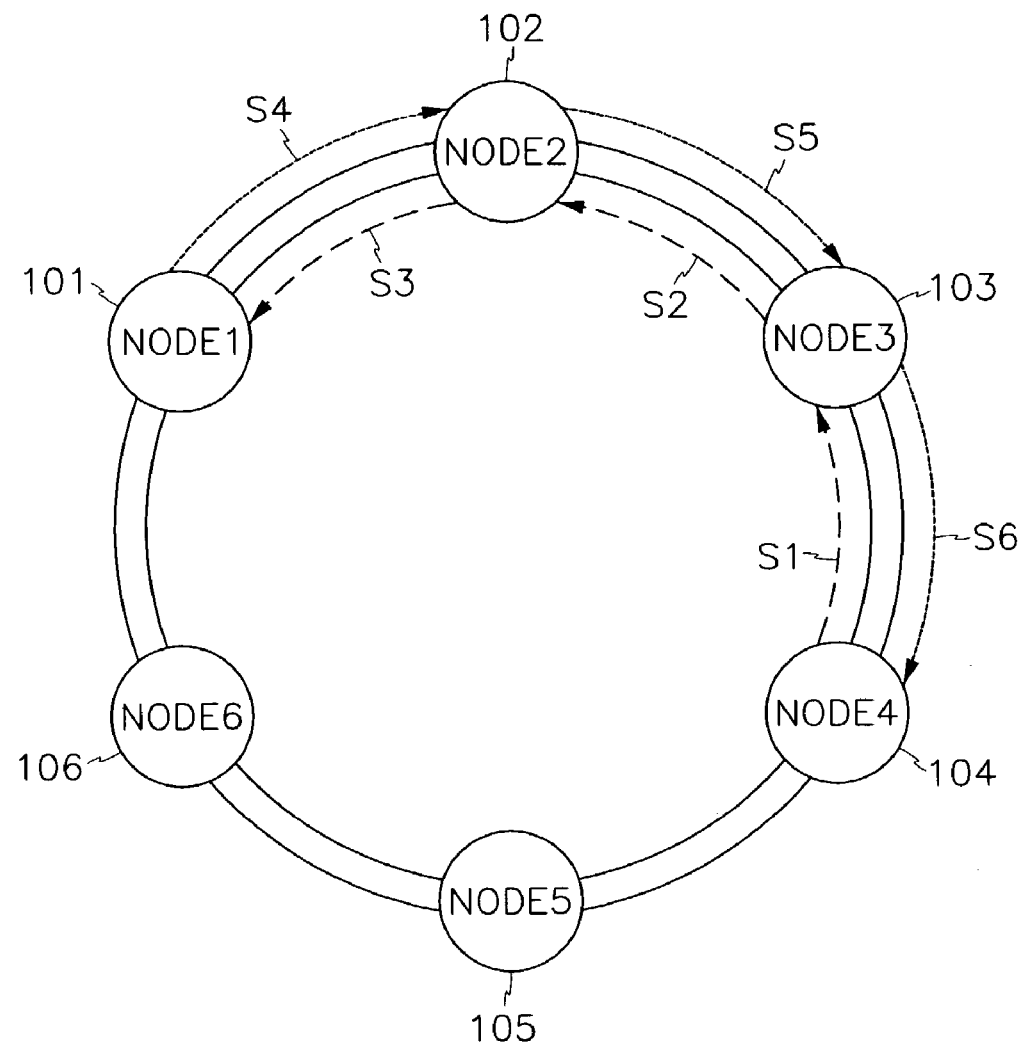
FIG. 2 is a diagram showing the flow of control packets according to the embodiment of the present invention in the communication system shown in FIG. 1.

FIG. 2 shows the flow of control packets according to the embodiment of the present invention in the dual ring communication system shown in FIG. 1.

In a normal state without congestion, each node uses a desired bandwidth as in the conventional method, and increases the bandwidth by various methods. But, when congestion occurs, the node transmits a packet by the congestion control method according to the embodiment of the present invention.

As illustrated in FIG. 2, for example, when node 4 104 cannot transmit a packet as desired because of an excessively large bandwidth for a packet forwarding, it determines that congestion occurs, and transmits a congestion information packet in a direction diametrically opposed to a direction of the data packet, in step S1.

The node 3 103 involved in the congestion adds its congestion-related information to the congestion information packet forwarded from the node 4 104, and forwards the congestion information packet to an upper node, i.e., the node 2 102, in step S2. The node 2 102 not involved in the congestion forwards the congestion information packet directly to the upper node, in step S3.

The last node involved in dealing with the congestion, i.e., the node 1 101 performs bandwidth allocation based on its congestion-related information and information about the received congestion-related packet, and sends the result of bandwidth allocation on a bandwidth allocation packet in a direction of the data packet, in step S4. The bandwidth allocation packet is forwarded to the nodes 103 and 104 involved in the congestion. Upon receiving the bandwidth allocation packet, the nodes 103 and 104 respectively set the bandwidth allocated to the nodes 103 and 104 at a maximum transmission bandwidth of the nodes 103 and 104, and lower their packet transmission rate, in steps S5 and S6. In this manner, the congestion can be relieved with impartial bandwidth allocation.

Expediently, in the embodiment of the present invention, the adjacent node positioned in a forwarding direction of the congestion information packet is called the "upper node," and the adjacent node positioned in a forwarding direction of the bandwidth allocation packet is called the "lower node."

Figure 3:
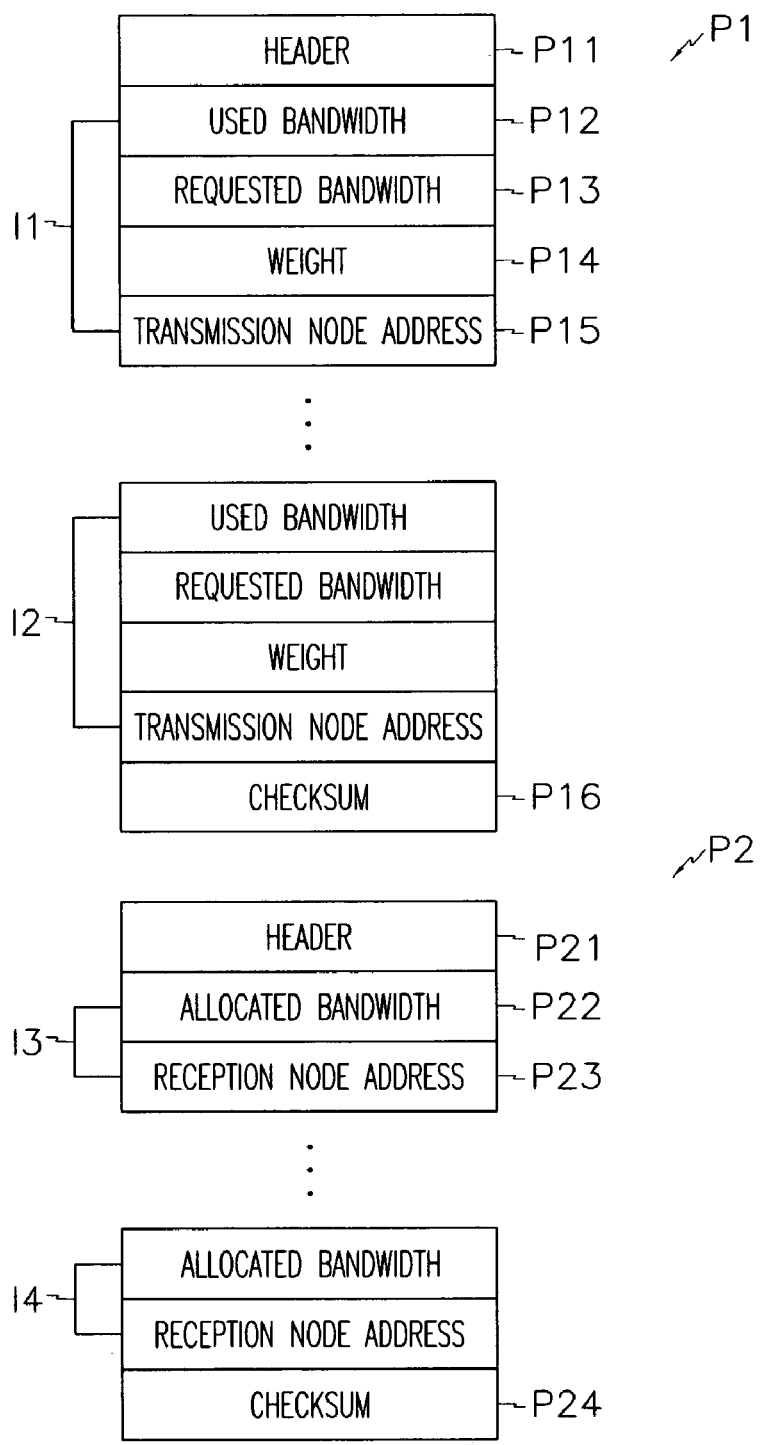
FIG. 3 is a schematic of control packets, i.e., a congestion information packet and a bandwidth allocation packet according to the embodiment of the present invention.

FIG. 3 is a schematic of a congestion information packet P1 and a bandwidth allocation packet P2 for congestion relief and bandwidth allocation according to the embodiment of the present invention.

The congestion information packet P1 reporting the occurrence of congestion comprises, as shown in FIG. 3, a header field P11, a used bandwidth field P12, a requested bandwidth field P13, a weight field P14, a transmission node address field P15, and a checksum field P16.

The header field P11 represents that the packet is a congestion information packet. The used bandwidth field P12 specifies a bandwidth current used by a node. The requested bandwidth field P13 specifies a requested bandwidth necessary for the node transmitting a packet. The requested bandwidth does not exceed the maximum bandwidth of the link.

The weight field P14 specifies a weight allocated to the node in the whole ring, and the weight can be expressed by various methods. For example, the weight can be given by a fractional expression of which the denominator is the sum of weights allocated to all the nodes and the numerator is the weight allocated to the corresponding node, the sum of the weights allocated to all the nodes being "1."

The transmission node address field P15 specifies the hardware address, i.e., a MAC (Media Access Control) address of a node currently transmitting the congestion information packet. The checksum field P16 is used to check whether or not the packet has an error. For example, upon receiving a checksum field generated from an operation for the packet, the node performs the same operation to generate a checksum field, and if the generated checksum field is identical to the checksum field included in the received packet, determines that the packet has no error.

On the other hand, congestion-related information I1 of each node comprises, as shown in FIG. 3, a used bandwidth, a requested bandwidth, a weight, and a transmission node address.

The congestion information packet P1, which is initially comprised of header field P11, used bandwidth field P12, requested bandwidth field P13, weight field P14, transmission node address field P15, and checksum field P16 as described above, is forwarded to an upper node. The individual nodes involved in the congestion add congestion-related information I2 comprised of a used bandwidth field, a requested bandwidth field, a weight field, and a transmission node address field to the received congestion information packet P1, correct the checksum field P16 of the congestion information packet P1, and send the revised congestion information packet P1 to the upper node.

The bandwidth allocation packet P2 for congestion relief comprises, as shown in FIG. 3, a header field P21, an allocated bandwidth field P22, a reception node address field P23, and a checksum field P24.

The header field P21 represents that the packet is a bandwidth allocation packet. The allocated bandwidth field P22 specifies a bandwidth allocated to each node as determined according to a bandwidth allocation algorithm.

The reception node address field P23 specifies the MAC address of the node receiving the bandwidth allocation packet. The checksum field P24 is used to determine whether or not the packet has an error.

Here, bandwidth allocation information I3 of each node is comprised of an allocated bandwidth, and a reception node address.

The bandwidth allocation packet P2, which is initially comprised of bandwidth allocation information (i.e., allocated bandwidth and reception node address) of as many as there are nodes involved in the congestion, and a checksum field, is forwarded to a lower node positioned in a direction diametrically opposed to the forwarding direction of the congestion information packet. The individual nodes involved in the congestion eliminate their bandwidth allocation information I4 from the received bandwidth allocation packet P2, correct the checksum field P24, and send the revised bandwidth allocation packet to the lower node.

Figure 4:
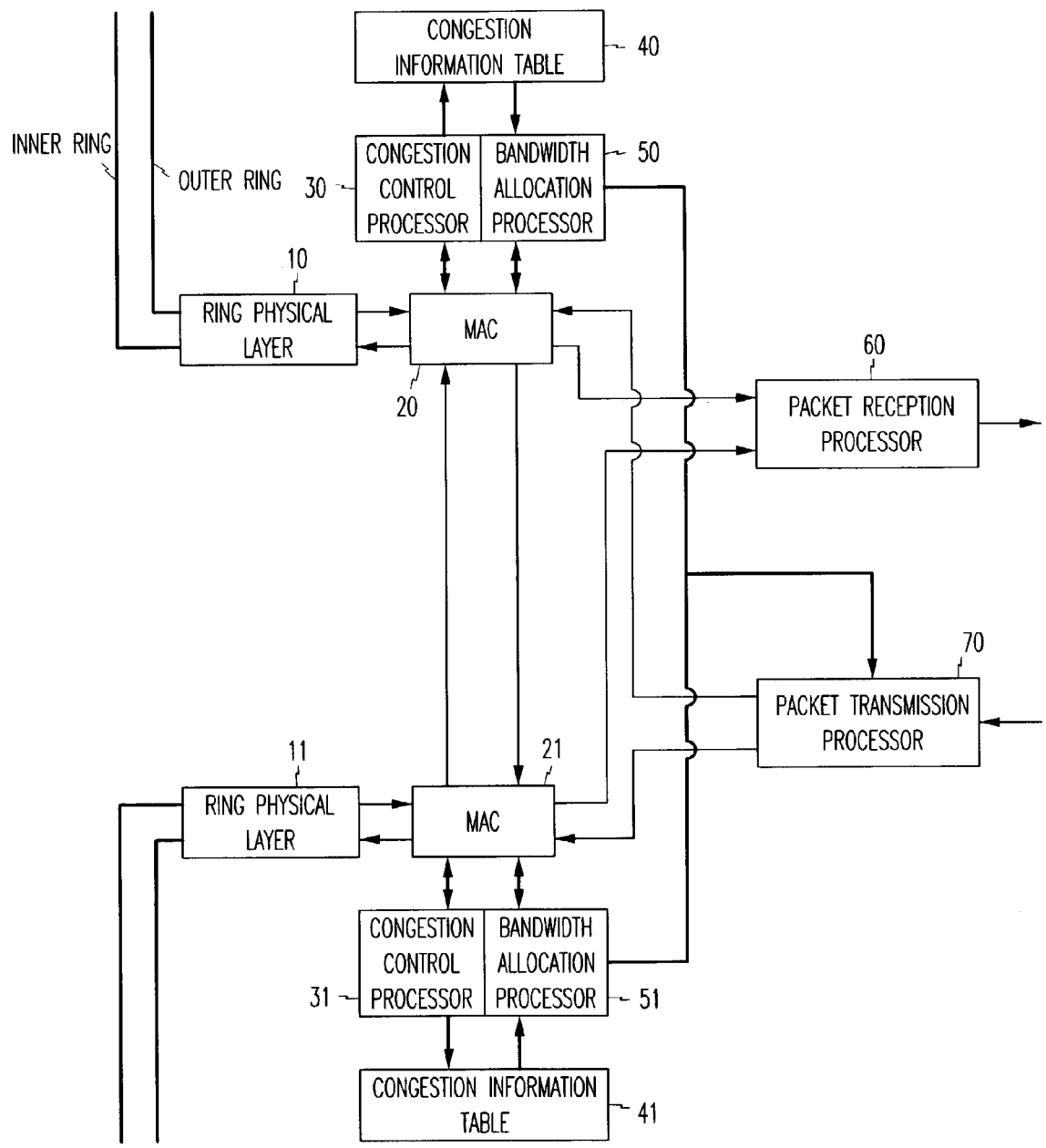
FIG. 4 is a schematic of a node system according to the embodiment of the present invention.

The structure of each node performing packet transmission and forwarding is illustrated in FIG. 4.

The node systems according to the embodiment of the present invention, i.e., wherein the nodes transmit or forward data generated from the upper layer in the bi-directional dual ring communication system, perform the congestion control method suggested in the present invention. For this purpose, each node comprises, as shown in FIG. 4, ring physical layers 10 and 11 for providing access to a link, MACs 20 and 21 used as a MAC for controlling transmission and forwarding of data and control packets on a ring and checking the occurrence of congestion, congestion control processors 30 and 31 for generating a congestion information packet when congestion occurs, congestion information tables 40 and 41 for storing information concerned, bandwidth allocation processors 50 and 51 for performing bandwidth allocation based on the information stored in the congestion information tables 40 and 41, a packet reception processor 60 for forwarding the received packet to the upper layer, and a packet transmission processor 70 for transmitting the packet of the upper layer to the ring through the MACs 20 and 21.

Now, a description will be given as to the operation of the bi-directional dual ring communication system according to the embodiment of the present invention.

The individual nodes on the dual ring determine whether or not congestion occurs, according to the relationship between a bandwidth of the packet forwarded from the upper node and a bandwidth of the packet to be transmitted.

More specifically, upon receiving a data packet from the upper node via the ring physical layer 10 or 11, the MAC 20 or 21 compares a first bandwidth of the forwarded packet, a second bandwidth of the packet to be transmitted, and the maximum bandwidth of the link. If the sum of the first and second bandwidths is greater than the maximum bandwidth of the link, then the MAC 20 or 21 determines that congestion occurs, and informs the congestion control processor 30 or 31 of the occurrence of congestion.

When congestion occurs, the congestion control processor 30 or 31 generates the congestion information packet P1 shown in FIG. 3 and sends it to the MAC 20 or 21. The MAC 20 or 21 transmits the generated congestion information packet P1 to the upper node that is an adjacent node positioned in a direction diametrically opposed to a transmission direction of the data packet. Then the node processes the received congestion information packet as follows.

Figure 5:
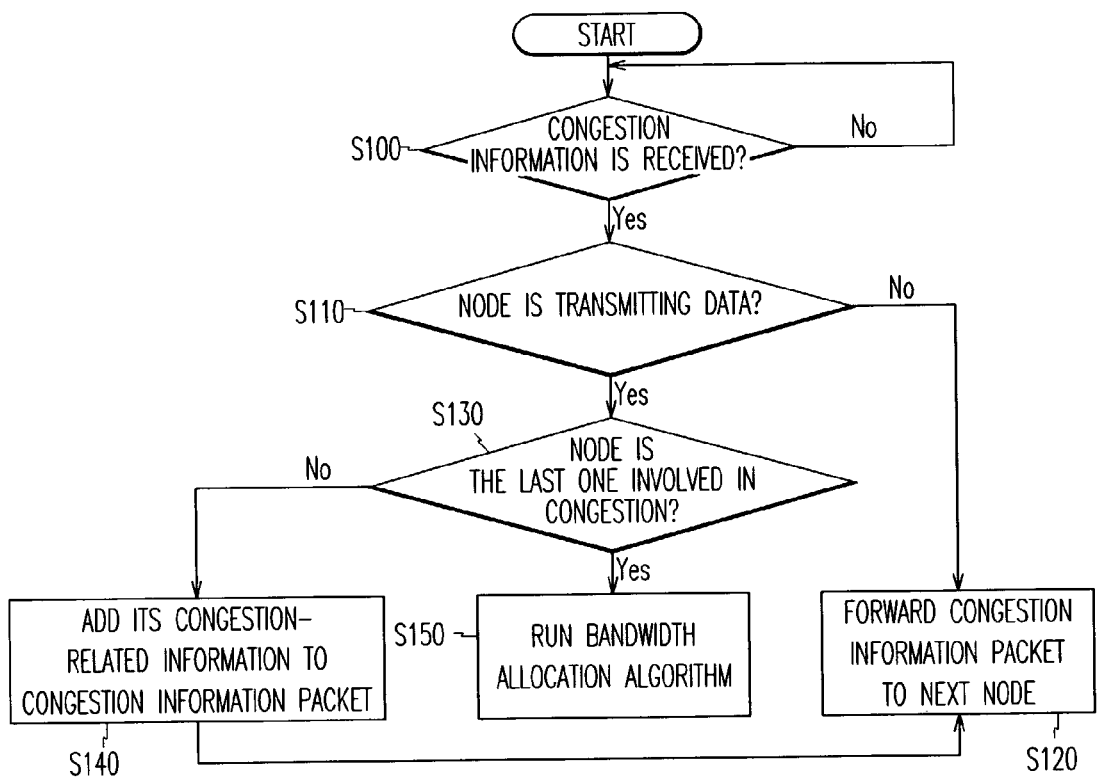
FIG. 5 is a flow chart showing congestion information packet processing according to the embodiment of the present invention.

FIG. 5 is a flowchart showing congestion information packet processing of each node according to the embodiment of the present invention.

The congestion information packet P1 from the lower node is forwarded to the congestion control processor 30 or 31 via the MAC 20 or 21. As illustrated in FIG. 5, the congestion control processor 30 or 31 checks in step S100 whether or not the congestion information packet P1 is received from the lower node. Upon receiving the congestion information packet P1, the congestion control processor 30 or 31 checks in step S110 whether or not the corresponding node is currently transmitting data.

If it is determined in step S10 that the node is not transmitting data, then the congestion control processor 30 or 31 determines that the node is not involved in the congestion, and forwards the congestion information packet P1 to the upper node, in step S120. If the node is transmitting data, then the congestion control processor 30 or 31 checks in step S130 whether or not the node is the last one involved in the congestion. More specifically, the node is considered to be the last one involved in the congestion when the sum of the bandwidth specified in the used bandwidth field of the received congestion information packet P1 and a bandwidth currently used by the node is equal to the maximum bandwidth of the link.

If the node is not the last one involved in the congestion as determined in step S130, then the congestion control processor 30 or 31 adds the congestion-related information I2 of the corresponding node to the received congestion information packet p1 and sends the congestion information packet P1 to the upper node, in step S140.

Otherwise, if the node is the last one involved in the congestion, then the congestion control processor 30 or 31 processes the received congestion information packet P1 and records information of the packet in the congestion information table 40 or 41. Subsequently, the bandwidth allocation processor 50 or 51 runs a bandwidth allocation algorithm based on the information stored in the congestion information table 40 or 41, in step S150. The bandwidth allocation algorithm can be embodied by various methods. For example, the allocated bandwidth of a node is expressed as the product of the maximum bandwidth of the link and the fraction in which the denominator is the sum of the requested bandwidths of all the nodes in the congestion information packet P1 and the requested bandwidth of the corresponding node. This can be expressed as follows:

Allocated bandwidth of node=(Requested bandwidth of corresponding node)/(Sum of requested bandwidths of nodes involved in congestion)× (Maximum bandwidth of link) [Equation 1]

In addition to this method, a method of allocating a bandwidth using a weight of each node in the above method can be used.

The bandwidth allocation processor 51 or 51 of the last node involved in the congestion runs a bandwidth allocation algorithm, generates the bandwidth allocation packet P2, and sends it to the MAC 20 or 21. The MAC 20 or 21 transmits the packet P2 to the adjacent lower node positioned in a direction diametrically opposed to a forwarding direction of the congestion information packet.

Upon receiving the bandwidth allocation packet P2, the node performs bandwidth allocation as follows.

Figure 6:
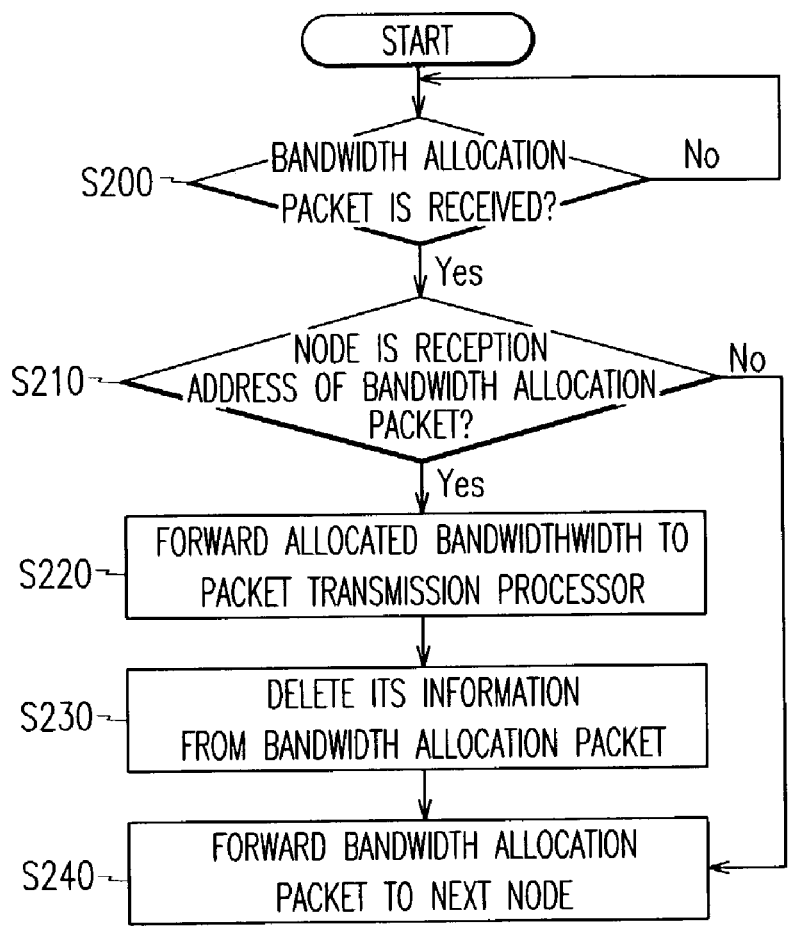
FIG. 6 is a flow chart showing bandwidth allocation packet processing according to the embodiment of the present invention.

FIG. 6 is a flow chart showing bandwidth allocation packet processing of each node.

The bandwidth allocation processor 50 or 51 determines, as shown in FIG. 6, whether or not the bandwidth allocation packet P2 is received from the upper node, in step S200. With the bandwidth allocation packet P2 received, the bandwidth allocation processor 50 or 51 checks in step S210 whether or not the MAC address of its node is included in the reception node address field P23 of the bandwidth allocation packet P2. If the MAC address of its node is not included in the reception node address field P23 of the bandwidth allocation packet P2, then the bandwidth allocation processor 50 or 51 forwards the bandwidth allocation packet P2 to the next node, i.e., the lower node.

Otherwise, if the MAC address of its node is included in the reception node address field P23, then the bandwidth allocation processor 50 or 51 forwards the bandwidth allocated to its node to the packet transmission processor 70 and deletes information about its node from the bandwidth allocation packet P2, in step 220. The bandwidth allocation processor 50 or 51 also forwards the bandwidth allocation packet P' removed of the information about its node to the lower node via the MAC 20 or 21, in steps S230 and S240.

The packet transmission processor 70 adjusts its transmission bandwidth to the allocated bandwidth.

In this manner, the nodes involved in the congestion communicate the congestion information packet and the bandwidth allocation packet with one another without being controlled by a specific node, thereby relieving the congestion and impartially allocating a bandwidth to the individual nodes involved in the congestion.

Figure 7:
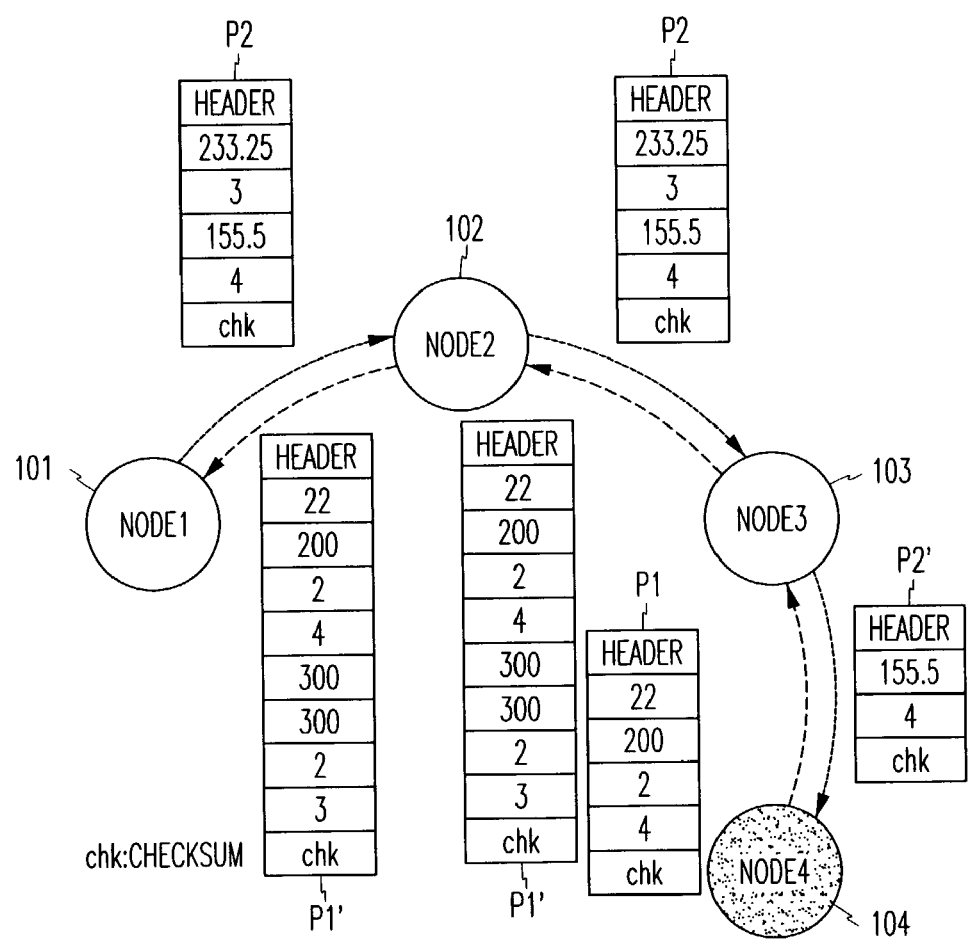
FIG. 7 is an exemplary illustration of a congestion control method according to the embodiment of the present invention.

FIG. 7 illustrates the above-stated congestion control method according to the embodiment of the present invention.

It is assumed that node 1 101 and node 3 103 send a packet to a specific node (one of the lower nodes of node 4 104) using a bandwidth of 300 Mbps, the maximum bandwidth of the link being 622 Mbps.

In this case, a bandwidth of no more than 22 Mbps can be used for the node 4 104 transmitting the packet to one of the lower nodes. The use of a bandwidth of greater than 22 Mbps causes congestion. Upon detecting the congestion, the node 4 104 generates the congestion information packet P1 and sends it to the upper node. The congestion information packet P1 includes information representing that the node is currently using a bandwidth of 22 Mbps with a requested bandwidth of 200 Mbps and a weight of 2, and that the transmission node is node 4.

Upon receiving the congestion information packet P1, the node 3 103 processes the congestion information packet P1 according to the congestion information packet processing of FIG. 5, and sends congestion information packet P1' including its congestion information to the node 2 102. The node 2 102 forwards the received congestion information packet P1' to the node 1 101, because it does not transmit the packet.

Upon receiving the congestion information packet P1', the node 1 101 considers itself as the last node involved in the congestion, and runs a bandwidth allocation algorithm. The node 1 101 allocates a bandwidth to the nodes involved in the congestion based on its requested bandwidth and weight, and the requested bandwidths of the individual nodes. Here, the allocated bandwidths are 233.25 Mbps for node 1 101, 233.25 Mbps for node 3 103, and 155.5 Mbps for node 4. After the completion of the bandwidth allocation, the node 1 101 reduces its transmission bandwidth to 233.25 Mbps and sends the bandwidth allocation packet P2 to the lower node through the outer ring.

Upon receiving the bandwidth allocation packet P2, the node 2 102 determines that its MAC address is not included in the received node MAC list of the bandwidth allocation packet, and forwards the packet to the lower node. The node 3 103 reduces the transmission bandwidth according to its allocated bandwidth, deletes its allocation information from the received bandwidth allocation packet P2, and forwards the bandwidth allocation packet to the lower node. Accordingly, the node 4 104 increases its transmission bandwidth to the allocated bandwidth according to the received bandwidth allocation packet P2'.

By this procedure, it is possible to relieve congestion on the ring, and impartially share the entire bandwidth of the link.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

The embodiment of the present invention efficiently controls congestion caused in the case where the individual nodes transmit packets in a bi-directional dual ring communication system comprised of a plurality of nodes.

Particularly, the nodes involved in the congestion communicate their information with one another using a congestion information packet and a bandwidth allocation packet to impartially allocate the bandwidth, thereby efficiently using the entire bandwidth of the link and solving the problem with the oscillating bandwidth. Furthermore, a different bandwidth is allocated to the individual nodes involved in the congestion according to the requested bandwidth or the used bandwidth, so as to achieve impartial bandwidth allocation.

What is claimed is:

1. A communication method, which is for a bi-directional dual ring communication system including a plurality of node systems, the communication method comprising:

(a) with congestion occurring in a first node system, the first node system generating a congestion information packet and forwarding the generated congestion information packet to an upper node system positioned in a direction opposed to a direction of forwarding a data packet;

b) a second node system determining whether or not it is the last node involved in the congestion, upon receiving the congestion information packet;

(c) the second node system adding its congestion-related information to the congestion information packet and forwarding the congestion information packet to an upper node system, when the second node system is not the last node involved in the congestion;

(d) the second node system performing bandwidth allocation for individual node systems based on information included in the congestion information packet, when the second node system is the last node involved in the congestion; and (e) after performing the bandwidth allocation, the second node system generating a bandwidth allocation packet and transmitting the generated bandwidth allocation packet to the individual node systems involved in the congestion, thereby causing the corresponding node systems to vary their transmission bandwidth and relieve congestion.

2. The communication method as claimed in claim 1, wherein the congestion information packet comprises:

a header field representing that the packet is a congestion information packet;

a used bandwidth field specifying a bandwidth currently used by the node system;

a requested bandwidth field specifying a requested bandwidth necessary for the node system transmitting its packet; and a transmission node address field specifying a hardware address of the node system currently transmitting the congestion information packet.

3. The communication method as claimed in claim 2, wherein the congestion information packet further comprises:

a weight field specifying a weight allocated to the corresponding node system in a whole ring; and a checksum field used to check whether or not the packet has an error.

4. The communication method as claimed in claim 2, wherein (b) comprises:

the second node system determining itself as the last node involved in the congestion, when the sum of the individual bandwidths specified in the used bandwidth field of the received congestion information packet and a bandwidth currently used by the second node system is equal to a predetermined maximum bandwidth.

5. The communication method as claimed in claim 2, wherein (c) comprises:

the second node system adding congestion-related information to the congestion information packet and forwarding the congestion information packet to the upper node system, the congestion-related information including a bandwidth being used by the second node system, a requested bandwidth necessary for the second node system transmitting the packet, and a hardware address of the second node system.

6. The communication method as claimed in claim 1, wherein the bandwidth allocation packet comprises:

a header field representing that the packet is a bandwidth allocation packet;

an allocated bandwidth field specifying a bandwidth allocated to each node system as determined from the bandwidth allocation; and a reception node address field specifying hardware addresses of the node systems receiving the bandwidth allocation packet.

7. The communication method as claimed in claim 6, wherein the bandwidth allocation packet further comprises:

a checksum field used to check whether or not the packet has an error.

8. The communication method as claimed in claim 6, wherein (e) comprises:

upon receiving the bandwidth allocation packet, the node system storing its allocated bandwidth, deleting its information from the bandwidth allocation packet, and forwarding the bandwidth allocation packet to a lower node system positioned in a forwarding direction of the bandwidth allocation packet, when the hardware address of the corresponding node system is recorded in the reception node address field of the bandwidth allocation packet; and the node system adjusting its transmission bandwidth to the allocated bandwidth based on the stored information.

9. The communication method as claimed in claim 6, wherein (d) comprises:

allocating the bandwidth to each node system involved in the congestion according to the following equation:

Allocated bandwidth of node=(Requested bandwidth of corresponding node)/(Sum of requested bandwidths of nodes involved in congestion) .times.(Maximum bandwidth of link).

10. The communication method as claimed in claim 6, further comprising:

forwarding the received congestion information packet to an upper node system, when the second node system is neither the last node system involved in the congestion nor a node system involved in the congestion.

11. The communication method as claimed in claim 1, wherein (a) comprises:

comparing a first bandwidth of the received data packet, a second bandwidth of a packet to be transmitted, and a maximum bandwidth of a link, and determining that congestion occurs when the sum of the first and second bandwidths is greater than the maximum bandwidth of the link.

12. A node system, which is used as a node in a bi-directional dual ring communication system, the node system comprising:

a ring physical layer for providing access to a link on the dual ring;

a MAC (media access controller) for controlling transmission and forwarding of a data packet and a control packet through the ring physical layer, and determining the occurrence of congestion based on the bandwidth of the input data packet;

a congestion control processor for generating a congestion information packet, when the congestion occurs, and transmitting the generated congestion information packet to an upper node system positioned in a direction opposed to a forwarding direction of the data packet;

a bandwidth allocation processor for receiving a bandwidth allocation packet from the upper node system via the MAC, and performing bandwidth allocation based on information stored in the bandwidth allocation packet; a packet reception processor for forwarding the data packet received via the MAC to an upper layer; and a packet transmission processor for adjusting the bandwidth of the data packet to be transmitted to a bandwidth determined according to the bandwidth allocation of the bandwidth allocation processor, and transmitting the data packet to the upper layer on the ring through the MAC.

13. The node system as claimed in claim 12, wherein the congestion information packet comprises:
a header field representing that the packet is a congestion information packet;
a used bandwidth field specifying a bandwidth currently used by the node system;
a requested bandwidth field specifying a requested bandwidth necessary for the node system transmitting its packet; and
a transmission node address field specifying a hardware address of the node system currently transmitting the congestion information packet.

14. The node system as claimed in claim 13, wherein the congestion information packet further comprises:
a weight field specifying a weight allocated to the corresponding node system in a whole ring; and
a checksum field used to check whether or not the packet has an error.

15. The node system as claimed in claim 12, wherein the bandwidth allocation packet comprises:
a header field representing that the packet is a bandwidth allocation packet;
an allocated bandwidth field specifying a bandwidth allocated to each node system as determined from the bandwidth allocation; and
a reception node address field specifying hardware addresses of the node systems receiving the bandwidth allocation packet.

16. The node system as claimed in claim 15, wherein the bandwidth allocation processor adjusts its transmission bandwidth based on its allocated bandwidth recorded in the allocated bandwidth field of the bandwidth allocation packet.

17. A dual ring communication system, which is for a bi-directional dual ring communication system including a plurality of node systems, the dual ring communication system comprising:
a first node system for generating a congestion information packet and forwarding the generated congestion information packet to an upper node system positioned in a direction diametrically opposed to a direction of forwarding a data packet, when a bandwidth of a data packet input from the upper node and a bandwidth of a data packet to be transmitted are tested to sense congestion; and
a second node system being the last node system involved in the congestion, the second node system performing bandwidth allocation based on the congestion information packet forwarded from the first node system, generating a bandwidth allocation packet according to the result of the bandwidth allocation, and transmitting the generated bandwidth allocation packet to the first node system, thereby causing the first node system to adjust a transmission bandwidth.

18. The dual ring communication system as claimed in claim 17, further comprising:
at least one third node system positioned between the first and second node systems, the third node system, if involved in the congestion, adding its congestion-related information to the congestion information packet, forwarding the congestion information packet to the second node system, and adjusting its transmission bandwidth based on the bandwidth allocation packet.

19. The dual ring communication system as claimed in claim 17, wherein the first node system comprises:
a ring physical layer for providing access to a link on the dual ring;
a MAC for controlling transmission and forwarding of the data packet and a control packet through the ring physical layer, and determining the occurrence of congestion based on the bandwidth of the input data packet; a congestion control processor for generating a congestion information packet as the control packet, when the congestion occurs, and transmitting the generated congestion information packet to an upper node system positioned in a direction diametrically opposed to a forwarding direction of the data packet; a bandwidth allocation processor for receiving a bandwidth allocation packet as the control packet forwarded from the upper node system via the MAC, and performing bandwidth allocation based on information stored in the bandwidth allocation packet;
a packet reception processor for forwarding the data packet received via the MAC to an upper layer; and
a packet transmission processor for adjusting the bandwidth of the data packet to be transmitted to a bandwidth determined according to the bandwidth allocation of the bandwidth allocation processor, and transmitting the data packet to the upper layer on the ring through the MAC.

20. The dual ring communication system as claimed in claim 17, wherein the second node system comprises:
a ring physical layer for providing access to a link on the dual ring;
a MAC for controlling transmission and forwarding of the data packet and a control packet through the ring physical layer;
a congestion information table for storing congestion information;
a congestion control processor for processing a congestion information packet as the control packet received via the MAC, and storing the corresponding congestion information in the congestion information table;
a bandwidth allocation processor for performing bandwidth allocation based on the congestion information stored in the congestion information table, generating a bandwidth allocation packet according to the bandwidth allocation, and providing the generated bandwidth allocation packet to the MAC, thereby causing the bandwidth allocation packet to be forwarded to lower node systems positioned in a direction diametrically opposed to a forwarding direction of the congestion information packet; and
a packet transmission processor for adjusting the bandwidth of the data packet to be transmitted to a bandwidth determined according to the bandwidth allocation of the bandwidth allocation processor, and transmitting the data packet to the upper layer on the ring through the MAC.

21. The dual ring communication system as claimed in claim 17, wherein the congestion information packet comprises:
a header field representing that the packet is a congestion information packet;

a used bandwidth field specifying a bandwidth currently used by the node system;

a requested bandwidth field specifying a requested bandwidth necessary for the node system transmitting its packet;

a weight field specifying a weight allocated to the node system in a whole ring; a transmission node address field specifying a hardware address of the node system currently transmitting the congestion information packet; and a checksum field used to check whether or not the packet has an error.

22. The dual ring communication system as claimed in claim 17, wherein the bandwidth allocation packet comprises:

a header field representing that the packet is a bandwidth allocation packet;

bandwidth-related information of as many as there are node systems involved in the congestion, the bandwidth-related information including an allocated bandwidth field specifying a bandwidth allocated to each node system as determined from the bandwidth allocation, and a reception node address field specifying hardware addresses of the node systems receiving the bandwidth allocation packet; and a checksum field used to check whether or not the packet has an error.

* * * * *